United States Patent Office 3,446,637
Patented May 27, 1969

3,446,637
CERAMIC MATERIAL AND METHOD
John A. Earl, Alhambra, Calif., assignor to Physical Science Corporation, Arcadia, Calif., a corporation of California
No Drawing. Filed Mar. 18, 1964, Ser. No. 352,976
Int. Cl. C03c 5/02, 3/10
U.S. Cl. 106—49                                13 Claims

ABSTRACT OF THE DISCLOSURE

This invention relates to a ceramic material for providing a hermetic seal with the oxides of certain metals such as iron, nickel and chromium and particularly with stainless steel of the 400 series. The ceramic material has properties of providing this hermetic seal to temperatures of approximately 1000° F. The ceramic material also has properties of providing an electrical resistivity of at least $10^6$ ohms/square centimeter to temperatures of approximately 800° F. The invention also relates to methods of producing the ceramic material from different fluxes each of which has properties providing a contribution to the properties of the ceramic material.

---

This invention relates to a ceramic material for providing a hermetic seal through an extended range of temperatures. The ceramic material is adapted to provide a hermetic seal with the oxides of certain metals, such as iron, nickel and chromium, and is particularly adapted to provide a hermetic seal with stainless steel of the 400 series. The invention also relates to methods of producing the novel ceramic material included in this invention.

As the scientific age progresses, it becomes increasingly important to provide measuring equipment which can operate with considerable accuracy. One way of providing such accuracies is to provide measurements at relatively low pressures approaching complete vacuums. This requires that helium-leak type arrangements be provided to insure that any vacuums produced will be maintained with continued operation of the measuring equipment. Such helium-leak type arrangements often have to be maintained with considerable variations in temperature, such as between approximately 70° F. and 1000° F.

Considerable effort has been devoted in the past to provide a ceramic material which will produce a hermetic seal with various metals such as the oxides of iron, nickel, and chromium and such as stainless steel of the 400 series, and which will maintain these hermetic seals through an extended range of temperatures to temperatures as high as 1000° F. The problems have been compounded when the hermetic seal has been made to relatively thin members, such as connector pins.

This invention provides a ceramic material which overcomes the above disadvantages. The material is able to be bonded to various metals, such as the oxides of iron, nickel and chromium, and to stainless steel, preferably of the 400 series, and used through an extended range of temperatures as high as 1,000° F. The ceramic material constituting this invention is also able to be bonded to relatively thin members such as connector pins to provide a hermetic seal with the pins through the extended range of temperatures. For example, the ceramic material constituting this invention provides a hermetic seal of $1\times10^{-10}$ cubic centimeters of helium per second at approximately room temperature of 70° and through an extended range of temperatures to a temperature of approximately 1,000° F.

Various materials capable of being used in forming ceramics may be generally divided as follows into three groups of categories.

TABLE I

Glass modifiers:
    Lithium oxide ($Li_2O$)
    Sodium oxide ($Na_2O$)
    Potassium oxide ($K_2O$)
    Lead oxide (PbO)
    Zinc oxide (ZnO)
    Strontium oxide (SrO)
    Barium oxide (BaO)
    Calcium oxide (CaO)
    Magnesium oxide (MgO)
Glass formers:
    Arsenic oxide ($As_2O_3$)
    Boron oxide ($B_2O_3$)
    Bismuth oxide ($Bi_2O_3$)
    Aluminum oxide ($Al_2O_3$)
    Lanthanum oxide ($La_2O_3$)
Glass acid:
    Silicon dioxide ($SiO_2$)
    Cerium dioxide ($CeO_2$)
    Zirconium dioxide ($ZrO_2$)
    Titanium dioxide ($TiO_2$)
    Molybdenum trioxide ($MoO_3$)

It will be appreciated that the listing of some of the materials in Table I may be considered as somewhat arbitrary since these materials may be considered by some people as belonging in a different one of the lists than set forth in Table I. However, the listing of the materials as set forth in Table I would be considered as proper by many of the experts in the art. It will also be appreciated that other materials may also be included in each of the different categories. For example, the oxides of copper and silver may be included in the first category designated as the glass modifiers. These additional materials have not been included because they have low electrical resistivities and because at least some of these materials will even act as electrical conductors in colloidal solutions.

The glass modifiers may in general be considered as having alkaline properties and the properties of a base. The glass modifiers may be further considered as having a chemical formula which may be designated as $R_2O$ or RO, where R indicates the element forming the compound with the oxygen (O). The alkalinity of the element in combination with oxygen in the glass modifying category or group tends to decrease progressively down the list, as does the reactivity of the compound with an acid. The electrical resistivity of the material at any particular temperature tends to increase progressively down the list. The melting temperature of the compounds in the glass modifiers tends to increase progressively down the list. No definite pattern as to the thermal coefficient of expansion of the oxides in the first category occurs with progressive listings in this category.

The third category or group may be considered as glasses and as having acidic properties. The chemical formula of these glasses may be expressed as $RO_2$ or $RO_3$, where R is the element forming the glass compound with the oxygen. The melting temperatures of the different oxides included in the third category or group tend to increase progressively down the list although the melting temperature of all the oxides in the third category are relatively high. The reactivity of the different oxides in the third category with acids tends to increase progressively down the list. No definite pattern as to the thermal coefficient of expansion of the oxides in the third category occurs with progressive listings in the category.

The second category or group of compounds may be designated as glass formers in that the compounds in the second category tend to react with the compounds in the third category to form the ceramic mtaerials. The compounds in the second category or group may be designated by the chemical formula $R_2O_3$, where R indicates the element forming the compound with the oxygen. The glass formers are intermediate in chemical and physical properties to the glass modifiers and to the glasses. For example, the glass formers may react chemically with either acidic or alkaline materials. The acid resistivity of the different oxides in the second category tends to increase progressively down the list, as does the melting temperature of the different oxides in this category. No definite pattern tends to exist as to the thermal coefficient of expansion of the different oxides listed progressively in the second category.

The ceramics constituting this invention are formed by combining materials from each of the three categories set forth above. The particular materials used and the properties of such materials are dependent upon the characteristics desired for the ceramics to be produced from the materials. For example, such characteristics as the melting temperature of the ceramic, the acid resistance of the ceramic, the thermal coefficient of expansion of the ceramic for different temperatures and the electrical resistivity of the ceramic at different temperatures may be controlled by varying the particular materials used and by varying the proportions of such materials. Although the ceramics constituting this invention may be used as glasses, they can also be used as coatings or glazes and designated as "enamels."

The ceramic constituting this invention is formed by several fluxes, each having a different melting temperature. As will be seen from Table II, flux A is formed from a glass modifier such as red lead, a glass former such as boric acid, and silicon dioxide as the glass. Flux A is produced by intimately mixing particles of the different materials in the flux and by smelting the mixture in a covered crucible at a temperature of approximately 2100° F. This temperature suffices to homogenize the flux. The mixture is then quenched as in water and is ground into fine particles having a size in the order of 400 mesh.

Flux A may be produced by mixing the following materials in the percentages indicated below:

TABLE II

| Material— | Relative percentage by weight |
|---|---|
| Red lead ($Pb_3O_4$) | 68.5 |
| Boric acid ($H_3BO_3$) | 10.5 |
| Silicon dioxide ($SiO_2$) | 21.0 |

The various materials are included in flux A in the specified percentages for certain important reasons.

The oxide of silicon generally constitutes one of the basic compounds of ceramic materials. As will be seen, it is the only compound in flux A from the group designated "glass acids" in Table I. The boric acid is included to reduce the melting temperature of the flux.

The oxide of lead is included as the primary glass modifier because it has good properties of flexibility. This is advantageous in insuring that the ceramic material constituting this invention will serve as a barrier in preventing gas molecules such as helium from flowing through the ceramic material, even when the ceramic material is subjected to stresses and strains. Furthermore, the oxide of lead has a relatively low melting temperature. Because of this, the oxide of lead tends to reduce the melting temperature of flux A, especially since the oxide of lead constitutes the predominant material in flux A by weight. The oxide of lead may also be considered advantageous in that it has a relatively high electrical resistivity. This is desirable when the ceramic material is used as an electrical insulator in certain electrical members such as connectors. The red lead ($Pb_3O_4$) becomes converted to lead oxide (PbO) by the liberation of oxygen during the smelting operation.

Flux B is produced in a manner somewhat similar to flux A. However, the different materials in flux B are initially mixed and then calcined or smelted at a temperature of approximately 2400° F. to melt all of the materials in the mixture. Also, this melted mixture is then quenched, as in water when smelted, and is ground (whether calcined or smelted) into relatively fine particles, such as particles having a size in the order of 400 mesh. Flux B is provided to color the ceramic produced and to help improve the adherence to the metal.

Flux B may be formed from the following materials in the specified percentages by weight.

TABLE III

| Material— | Relative percentage by weight |
|---|---|
| Zinc oxide (ZnO) | 33.0 |
| Silicon dioxide ($SiO_2$) | 34.0 |
| Cobalt oxide ($Co_3O_4$) | 33.0 |

The oxide of cobalt is included as one of the glass modifiers to enhance the adherence of the ceramic material to various metals such as stainless steel. The oxide of cobalt creates a chemical bond with the oxides of iron, nickel, and cobalt and with such metals as stainless steel to enhance the tendency of the ceramic material to produce a hermetic seal with the stainless steel. The oxide of cobalt has a relatively low melting temperature and a medium coefficient of expansion; it also constitutes an active glass former.

The black cobalt oxide ($Co_3O_4$) becomes converted to cobalt oxide (CoO) when the material indicated in Table III is smelted.

A third flux C is produced in a manner somewhat similar to fluxes A and B, but the smelting temperature is approximately 1800° F., which is the lowest in this case as compared with the temperatures used to produce fluxes A and B.

TABLE IV

| Material— | Relative percentage by weight |
|---|---|
| Red lead ($Pb_3O_4$) | 80 |
| Boric acid ($H_3BO_3$) | 20 |

The ceramic material constituting this invention is produced by mixing fluxes A, B, and C in the relative percentages of approximately

| | Percent |
|---|---|
| A | 15 |
| B | 40 |
| C | 45 | of each flux by weight.

Taking all fluxes A, B, and C together, the preferred embodiment of the invention is constituted by using row materials in the following percentages by weight:

TABLE V

| Material— | Relative percentage by weight |
|---|---|
| $Pb_3O_4$ | 46.26 |
| ZnO | 13.20 |
| $H_3BO_3$ | 12.21 |
| $SiO_2$ | 15.13 |
| $Co_3O_4$ | 13.20 |

After fluxes A, B, and C have been intimately mixed, the mixture is heated to an elevated temperature. Flux C melts at a relatively low temperature and tends to dig into the oxides of the metal with which it will be providing a hermetic seal. Flux C is further advantageous in that it provides an incipient action in inducing the melting of fluxes A and B, which melt at a higher temperature than flux C. When fluxes A and B start to melt, they enhance the gripping action of the resultant ceramic material with the oxide of the metal to which they are being chemically and mechanically adhered.

The mixture of fluxes A, B, and C is thus subjected to a heating treatment during which the ceramic matures. The temperature of this maturing treatment is about 1250° F., lasting for about twenty minutes.

The ceramic material produced by the mixtures of fluxes A, B, and C has a thermal coefficient of expansion approaching that of the metal, such as stainless steel, to which it will be bonded. The ceramic material is especially adapted to be bonded to stainless steel of the 400 series, but it may also be bonded to other types of stainless steel and to oxides such as those of iron, nickel, and chromium. The thermal coefficient of expansion of the ceramic material constituting this invention is approximately $4.4 \times 10^{-6}$ inch/inch/deg. F., which is similar to that of stainless steel of the 400 series. As previously described, the ceramic material provides a hermetic seal of approximately $1 \times 10^{-10}$ cubic centimeters of helium per second at both room temperatures of approximately 70° F. and elevated temperatures in the order of 1000° F. The electrical resistivity of the ceramic material is in the order of magnitude of $10^{11}$ ohms/square centimeter at room temperature and has an order of magnitude of approximately $10^6$ ohms/square centimeter at an elevated temperature of approximately 800° F.

The different oxides in the preferred embodiment of the ceramic material constituting this invention have the following percentages by weight:

TABLE VI

| Material— | Relative percentage by weight |
| --- | --- |
| Lead oxide (PbO) | 49.0 |
| Boron oxide ($B_2O_3$) | 7.3 |
| Silicon dioxide ($SiO_2$) | 16.00 |
| Zinc oxide (ZnO) | 14.00 |
| Cobalt oxide (CoO) | 13.7 |

The different materials in flux A may be varied in relative weight in the flux in accordance with the table indicated below:

TABLE VII

| Material— | Range of relative percentages by weight |
| --- | --- |
| Red lead ($Pb_3O_4$) | 60–78 |
| Boric acid ($H_3BO_3$) | 5–15 |
| Silicon dioxide ($SiO_2$) | 15–25 |

The different materials which enter flux B may be varied in relative weight in the flux in accordance with the table indicated below:

TABLE VIII

| Material— | Range of relative percentages by weight |
| --- | --- |
| Zinc oxide (ZnO) | 25–40 |
| Silicon dioxide ($SiO_2$) | 25–40 |
| Cobalt oxide ($Co_3O_4$) | 0–40 |

The cobalt oxide, in particular, has a wide range because it serves as a coloring substance as well as a flux.

The two materials entering flux C may be varied in relative weight in the flux in accordance with the table indicated below:

TABLE IX

| Material— | Range of relative percentages by weight |
| --- | --- |
| Red lead ($Pb_3O_4$) | 75–85 |
| Boric acid ($H_3BO_3$) | 25–15 |

As far as all fluxes are concerned, the ranges of raw material entering all fluxes together, taking into consideration the relative proportion of each flux, are as follows:

TABLE X

| Material— | Range of relative percentages by weight |
| --- | --- |
| $Pb_3O_4$ | 40–50 |
| ZnO | 10–18 |
| $H_3BO_3$ | 10–15 |
| $SiO_2$ | 10–20 |
| $Co_3O_4$ | 0–15 |

The ultimate compound resulting from mixing together fluxes A, B, and C will then have the following ranges:

TABLE XI

| Material— | Range of relative percentages by weight |
| --- | --- |
| Lead oxide (PbO) | 42–55 |
| Zinc oxide (ZnO) | 10–18 |
| Boron oxide ($B_2O_3$) | 5–10 |
| Silicon dioxide ($SiO_2$) | 10–20 |
| Cobalt oxide (CoO) | 0–15 |

It is a specific aspect of the present invention that a similar composition can be attained, but exhibiting a slightly higher maturing temperature and this being slightly harder, having a maturing temperature 50 degrees to 100 degrees above that of the three-flux mixture. In this case, only two fluxes are being used, denoted in the following description as D and E.

Flux D may be produced by mixing the following materials:

TABLE XII

| Material— | Relative percentage by weight |
| --- | --- |
| Red lead ($Pb_3O_4$) | 40.0 |
| Zinc oxide (ZnO) | 16.5 |
| Boric acid ($H_3BO_3$) | 10.0 |
| Silicon dioxide ($SiO_2$) | 17.0 |
| Cobalt oxide ($Co_3O_4$) | 16.5 |

This mixture is smelted at a temperature approximately 2200° F. In this embodiment, the smelting temperatures of the two fluxes used are similar.

Flux E may have the following composition:

TABLE XIII

| Material— | Relative percentage by weight |
| --- | --- |
| Zinc oxide (ZnO) | 33.0 |
| Silicon dioxide ($SiO_2$) | 34.0 |
| Cobalt oxide ($Co_3O_4$) | 33.0 |

Flux E is calcined at 2400° F.

The ceramic material constituting this invention is produced by mixing fluxes D and E, whereby about 35 percent in weight is used of flux D and 65 percent in weight, of flux E.

After fluxes D and E have been intimately mixed, the mixture is heated to an elevated temperature of about 1375° F., whereby the ceramic matures. The maturing lasts for about twenty minutes.

It will be apparent that the three-flux ceramic aforedescribed (fluxes A, B, C) matured at a temperature about 25 degrees to 50 degrees below the maturing temperature of the two-flux cramic. The latter will thus be somewhat harder.

The different materials employed in fluxes D and E may be varied in relative weight, while the total of each material as employed in both fluxes remains in the range outlined in Table X.

The material of flux D may be varied as set forth in the following table:

TABLE XIV

| Material— | Range of relative percentages by weight |
| --- | --- |
| Pbo | 30–50 |
| ZnO | 10–20 |
| $B_2O_3$ | 5–15 |
| $SiO_2$ | 10–25 |
| $Co_3O_4$ | 1–20 |

The different materials in flux E may be varied in relative weight in accordance with the following table:

TABLE XV

| Material— | Range of relative percentages by weight |
| --- | --- |
| ZnO | 25–40 |
| $SiO_2$ | 25–40 |
| $Co_3O_4$ | 0–40 |

The invention is not limited to the embodiments described above, but all changes and modifications thereof not constituting departures from the spirit and scope of the invention are intended to be covered by the following claims.

What is claimed is:

1. A method of forming a ceramic material comprising the steps of:
   mixing a first flux having the following materials in percentages by weight, $Pb_3O_4$—60% to 78%, $H_3BO_3$—5% to 15%, $SiO_2$—15% to 25%;
   smelting said first mixture at a relative temperature of approximately 2100° F.;
   mixing a second flux having the following materials in percentages by weight, ZnO—25% to 40%, $SiO_2$—25% to 40%, $Co_3O_4$—0 to 40%;
   calcining said second mixture at a relative temperature of approximately 2400° F.;
   mixing a third flux having the following materials in percentages by weight, $Pb_3O_4$—75% to 85%, $H_3BO_4$—15% to 25%;
   smelting said third mixture at a relative temperature of approximately 1800° F.;
   mixing said first, second and third fluxes in the relative percentages of approximately 15:40:45; and
   melting the resultant mixture to form a ceramic material.

2. A method of forming a ceramic material comprising the steps of:
   mixing a first flux having the following materials in percentages by weight, $Pb_3O_4$—68.5%, $H_3BO_3$—10.5%, $SiO_2$—21.0%;
   smelting said first mixture at a relative temperature of approximately 2100° F.;
   mixing a second flux having the following materials in percentages by weight, ZnO—33.0%, $SiO_2$—34.0%, $Co_3O_4$—33.0%;
   calcining said second mixture at a relative temperature of approximately 2400° F.;
   mixing a third flux having the following percentages by weight, $Pb_3O_4$—80%, $H_3BO_3$—20%;
   smelting said third mixture at a relative temperature of approximately 1800° F.;
   mixing said first, second and third fluxes in the relative percentages of 15:40:45; and
   melting the resultant mixture to form a ceramic material.

3. A method of forming a ceramic material comprising the steps of:
   mixing a first flux having the following materials in percentages by weight, PbO—30% to 50%, ZnO—10% to 20%, $B_2O_3$—5% to 15%, $SiO_2$—10% to 25%, $Co_3O_4$—1% to 20%;
   smelting said first mixture at a relative temperature of approximately 2200° F.;
   mixing a second flux having the following materials in percentages by weight, ZnO—25% to 40%, $SiO_2$—25% to 40%, $Co_3O_4$—up to 40%;
   calcining said second mixture at a relative temperature of aproximately 2400° F.;
   mixing said first and second fluxes at a weight ratio of 35:65; and
   melting the resultant mixture to form a ceramic material.

4. A method of forming a ceramic material comprising the steps of:
   mixing a first flux having the following materials in percentages by weight, $Pb_3O_4$—40.0%, ZnO—16.5%, $H_3BO_3$—10.0%, $SiO_2$—17.0%, $Co_3O_4$—16.5%;
   smelting said first mixture at a relative temperature of approximately 2200° F.;
   mixing a second flux having the following materials in percentages by weight, ZnO—33.0%, $SiO_2$—34.0%, $Co_3O_4$—33%;
   calcining said second mixture at a relative temperature of approximately 2400° F.;
   mixing said first and second fluxes at a weight ratio of 35:65; and
   melting the resultant mixture to form a ceramic material.

5. As a composition of matter, a ceramic having an electrical resistivity of at least $10^6$ ohms/centimeter$^2$ to temperatures of approximately 800° F. and providing a hermetic seal of approximately $10^{-10}$ cubic centimeters of helium per second to temperatures of approximately 1000° F., said ceramic comprising:
   49% PbO, 14% ZnO, 7.3% $B_2O_3$, 16% $SiO_2$, and 13.7% CoO, all percentages by weight.

6. As a composition of matter, a ceramic having an electrical resistivity of at least $10^6$ ohms/centimeter$^2$ to temperatures of approximately 800° F. and providing a hermetic seal of approximately $10^{-10}$ cubic centimeters of helium per second to temperatures of approximately 1000° F., said ceramic consisting essentially of:
   PbO in the range of 42% to 55%, ZnO in the range of 10% to 18%, $B_2O_3$ in the range of 5% to 10%, $SiO_2$ in the range of 10% to 20%, and CoO in the range up to 15%.

7. A method of producing a ceramic material, comprising the steps of:
   mixing a first flux consisting of approximately 60% to 78% by weight $Pb_3O_4$, 5% to 15% by weight $H_3BO_3$, 15% to 25% by weight $SiO_2$;
   smelting said mixture at about 2100° F.;
   mixing a second flux consisting of approximately 25% to 40% by weight ZnO, 25% to 40% by weight of $SiO_2$, up to 40% by weight of $Co_3O_4$;
   smelting said second flux at about 2400° F.;
   mixing a third flux consisting of approximately 75% to 85% by weight of $Pb_3O_4$ and 15% to 25% by weight of $H_3BO_3$;
   smelting said third flux at about 1800° F.;
   quenching and grinding each of said fluxes;
   mixing said first, second and third fluxes in the respective approximate ratios of 15:40:45; and
   maturing said mixed fluxes at about 1250° F.

8. A method of producing a ceramic material, comprising the steps of:
   producing a first flux consisting of 30% to 50% by weight PbO, 10% to 20% by weight ZnO, 5% to 15% by weight $B_2O_3$, 10% to 25% by weight $SiO_2$ and 1% to 20% by weight $Co_3O_4$;
   producing a second flux consisting of 25% to 40% by weight of PbO, 25% to 40% by weight of ZnO, and up to 40% by weight of $Co_3O_4$;
   smelting said first flux at about 2200° F.;
   calcining said second flux at about 2400° F.;
   quenching and grinding said fluxes;
   mixing said first and second fluxes in the approximate ratio of 35:65; and
   maturing said mixed fluxes at about 1375° F.

9. A ceramic material having an electrical resistivity of at least $10^6$ ohms/centimeter$^2$ to temperatures of approximately 800° F. and providing a hermetic seal of approximately $10^{-10}$ cubic centimeters of helium per second to temperatures of approximately 1000° F., the ceramic material consisting of:
   a first flux formed from essentially the following materials, all percentages by weight, $Pb_3O_4$—60% to 78%, $H_3BO_3$—5% to 15%, $SiO_2$—15% to 25%;
   a second flux formed from essentially the following materials, all percentages by weight, ZnO—25% to 40%, $SiO_2$—25% to 40%, $Co_3O_4$—up to 40%; and
   a third flux formed from essentially the following materials, all percentages by weight, $Pb_3O_4$—75% to 85%, $H_3BO_3$—15% to 25%;
   the first, second and third fluxes respectively having the percentages by weight of approximately 15:40:45.

10. A ceramic material having an electrical resistivity of at least $10^6$ ohms/centimeter$^2$ to temperatures of approximately 800° F. and providing a hermetic seal of approximately $10^{-10}$ cubic centimeters of helium per second to temperatures of approximately 1000° F., the ceramic material consisting of:
  a first flux formed from essentially the following materials, all percentages by weight, $Pb_3O_4$—68.5%, $H_3BO_3$—10.5%, $SiO_2$—21.0%;
  a second flux formed from essentially the following materials, all percentages by weight, ZnO—33.0%, $SiO_2$—34.0%, $Co_3O_4$—33.0%; and
  a third flux formed from essentially the following materials all percentages by weight, $Pb_3O_4$—80%, $H_3BO_3$—20%;
  the first, second and third fluxes respectively having the percentages by weight of approximately 15:40:45.

11. A ceramic material having an electrical resistivity of at least $10^6$ ohms/centimeter$^2$ to temperatures of approximately 800° F. and providing a hermetic seal of approximately $10^{-10}$ cubic centimeters of helium per second to temperatures of approximately 1000° F., the ceramic material consisting of:
  a first flux formed from essentially the following materials, all percentages by weight, PbO—30% to 50%, ZnO—10% to 20%, $B_2O_3$—5% to 15%, $SiO_2$—10% to 25%, $Co_3O_4$—1% to 20%; and
  a second flux formed from essentially the following materials, all percentages by weight, ZnO—25% to 40%; $SiO_2$—25% to 40%, $Co_3O_4$—up to 40%;
  the first and second fluxes respectively having percentages by weight of approximately 35% and 65%.

12. A ceramic material having an electrical resistivity of at least $10^6$ ohms/centimeter$^2$ to temperatures of approximately 800° F. and providing a hermetic seal of approximately $10^{-10}$ cubic centimeters of helium per second to temperatures of approximately 1000° F., the ceramic material consisting of:
  a first flux formed from essentially the following materials, all percentages by weight, $Pb_3O_4$—40.0%, ZnO—16.5%, $H_3BO_3$—10.0%, $SiO_2$—17.0%, $Co_3O_4$—16.5%; and
  a second flux formed from essentially the following materials, all percentages by weight, ZnO—33.0%, $SiO_2$—34.0%, $Co_3O_4$—33.0%;
  the first and second fluxes respectively having percentages by weight of approximately 35% and 65%.

13. In a ceramic material formed from a plurality of fluxes and having an electrical resistivity of at least $10^6$ ohms/centimeter$^2$ to temperatures of approximately 800° F., and providing a hermetic seal of approximately $10^{-10}$ cubic centimeters of helium per second to temperatures of approximately 800° F.,
  lead oxide in the range of approximately 42% to 55% by weight, boron oxide in the range of approximately 5% to 10% by weight and silicon dioxide in the range of approximately 10% to 20% by weight, and zinc oxide in the range of approximately 10% to 18% by weight.

References Cited
UNITED STATES PATENTS
2,425,032    8/1947    Deyrup _____ 106—49

JAMES E. POER, *Primary Examiner.*

U.S. Cl. X.R.

106—53, 54

Dedication 3,446,637.—*John A. Earl*, Alhambra, Calif. CERAMIC MATERIAL AND METHOD. Patent dated May 27, 1969. Dedication filed June 3, 1970, by the assignee, *Physical Sciences Corporation*.

Hereby dedicates the entire term of the patent to the Public.

[*Official Gazette November 10, 1970.*]